United States Patent
Jaskiewicz et al.

(10) Patent No.: US 10,954,971 B2
(45) Date of Patent: Mar. 23, 2021

(54) SERVOVALVE

(71) Applicant: Hamilton Sundstrand Corporation, Charlotte, NC (US)

(72) Inventors: Zbigniew Jaskiewicz, Wroclaw (PL); Lukasz Wiktorko, Wroclaw (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 54 days.

(21) Appl. No.: 15/950,213

(22) Filed: Apr. 11, 2018

(65) Prior Publication Data

US 2018/0372128 A1 Dec. 27, 2018

(30) Foreign Application Priority Data

Jun. 24, 2017 (EP) ..................................... 17461558

(51) Int. Cl.
*F15B 13/04* (2006.01)
*F15B 13/043* (2006.01)
(Continued)

(52) U.S. Cl.
CPC ........ *F15B 13/0402* (2013.01); *F15B 13/043* (2013.01); *F15B 13/0436* (2013.01);
(Continued)

(58) Field of Classification Search
CPC .............. F15B 13/0402; F15B 13/0435; F15B 13/0436; F15B 13/0438; F15B 13/044; F15B 13/0442; F15B 13/0444; F15B 13/0446; F15B 13/0448; F16K 31/004; F16K 31/005; F16K 31/006; F16K 31/007; F16K 31/008; F16K 31/12; H01L 41/09; Y10T 137/8225; Y10T 137/8242; Y10T 137/8275; Y10T 137/8158; Y10T 137/2278; Y10T 137/86598;
(Continued)

(56) References Cited

U.S. PATENT DOCUMENTS 3,152,612 A * 10/1964 Avery .................. F16K 31/006
137/625.4
4,046,061 A 9/1977 Stokes
(Continued)

FOREIGN PATENT DOCUMENTS

DE 4311218 A1 12/1994
EP 0427981 A1 10/1989
(Continued)

OTHER PUBLICATIONS

Extended European Search Report for International Application No. 17461558.3 dated Feb. 12, 2018, 7 pages.

*Primary Examiner* — Craig J Price
(74) *Attorney, Agent, or Firm* — Cantor Colburn LLP

(57) ABSTRACT

A servovalve includes: a fluid transfer valve assembly comprising a supply port and a control port; a moveable valve spool arranged to regulate flow of fluid from the supply port to the control port in response to a control signal; and a drive assembly configured to axially move the valve spool relative to the fluid transfer assembly in response to the control signal to regulate the fluid flow. The drive assembly comprises a piezoelectric actuator configured to vary the flow of fluid to respective ends of the valve spool in response to the control signal.

5 Claims, 3 Drawing Sheets

(51) Int. Cl.
*F16K 31/00* (2006.01)
*F16K 31/122* (2006.01)
*F16K 31/124* (2006.01)

(52) U.S. Cl.
CPC ........ *F15B 13/0438* (2013.01); *F16K 31/004* (2013.01); *F16K 31/007* (2013.01); *F16K 31/124* (2013.01); *F16K 31/1223* (2013.01); *F16K 31/008* (2013.01); *Y10T 137/86614* (2015.04)

(58) Field of Classification Search
CPC ....... Y10T 137/8659; Y10T 137/86606; Y10T 137/86614; Y10T 137/8663; Y10T 137/0318–053
USPC ................ 251/129.06; 91/459; 310/311–371
See application file for complete search history.

(56) References Cited

U.S. PATENT DOCUMENTS

| | | | | |
|---|---|---|---|---|
| 4,463,727 A | * | 8/1984 | Babitzka | F02M 41/1411 |
| | | | | 123/458ke |
| 4,700,794 A | * | 10/1987 | Bernhagen | B62D 11/183 |
| | | | | 180/6.44 |
| 4,825,894 A | | 5/1989 | Cummins | |
| 4,929,859 A | | 5/1990 | Suzuki et al. | |
| 6,526,864 B2 | | 3/2003 | Lindler et al. | |
| 6,786,238 B2 | | 9/2004 | Frisch | |
| 9,309,900 B2 | | 4/2016 | Kopp | |
| 10,344,885 B2 | * | 7/2019 | Brooks | F16K 31/12 |
| 2015/0047729 A1 | | 2/2015 | Kopp et al. | |
| 2017/0324021 A1 | * | 11/2017 | Bertrand | B60W 30/18 |
| 2018/0128393 A1 | * | 5/2018 | Wiktorko | F16K 11/07 |
| 2019/0195381 A1 | * | 6/2019 | Jaskiewicz | F15B 13/0438 |

FOREIGN PATENT DOCUMENTS

| | | |
|---|---|---|
| EP | 3321513 A1 | 5/2018 |
| FR | 1183778 A | 7/1959 |
| GB | 2104249 A | 3/1983 |
| WO | 0159306 A1 | 8/2001 |
| WO | 2006070655 A1 | 7/2006 |

* cited by examiner

SERVOVALVE

FOREIGN PRIORITY

This application claims priority to European Patent Application No. 17461558.3 filed Jun. 24, 2017, the entire contents of which is incorporated herein by reference.

TECHNICAL FIELD

The present disclosure relates to servovalves used to transfer quantities of, or manage the flow of fluid e.g. air.

BACKGROUND

Servovalves find a wide range of applications for controlling air or other fluid flow to effect driving or control of another part e.g. an actuator.

A servovalve assembly includes a drive assembly e.g. a motor controlled by a control current which controls flow to a valve e.g. an air valve to control an actuator. Generally, a servovalve transforms an input control signal into movement of an actuator cylinder. The actuator controls e.g. an air valve. In other words, a servovalve acts as a controller, which commands the actuator, which changes the position of an air valve's (e.g. a so-called butterfly valve's) flow modulating feature.

Such mechanisms are used, for example, in various parts of aircraft where the management of air/fluid flow is required, such as in engine bleeding systems, anti-ice systems, air conditioning systems and cabin pressure systems. Servovalves are widely used to control the flow and pressure of pneumatic and hydraulic fluids to an actuator, and in applications where accurate position or flow rate control is required. Some examples of application are aircraft, automotive systems and in the space industry.

Conventionally, servovalve systems operate by obtaining pressurised fluid from a high pressure source which is transmitted through a load from which the fluid is output as a control fluid. Various types of servovalves are known—see e.g. GB 2104249, US 2015/0047729 and U.S. Pat. No. 9,309,900.

Electrohydraulic servovalves can have a first stage with a motor, e.g. an electrical or electromagnetic force motor or torque motor, controlling flow of a hydraulic fluid to drive a valve member e.g. a spool valve of a second stage, which, in turn, can control flow of hydraulic fluid to an actuator for driving a load. The motor can operate to position a moveable member, such as a flapper, in response to an input drive signal or control current, to drive the second stage valve member e.g. a spool valve.

Such conventional systems will be described in more detail below with reference to FIGS. 1b and 1c.

Particularly in aircraft applications, but also in other applications, servovalves are often required to operate at various pressures and temperatures. For e.g. fast acting air valve actuators, relatively large flows are required depending on the size of the actuator and the valve slew rate. For such high flow rates, however, large valve orifice areas are required. For 'flapper' type servovalves, problems arise when dealing with large flows due to the fact that flow force acts in the direction of the flapper movement and the motor is forced to overcome the flow forces. For clevis-like metering valves such as described in U.S. Pat. Nos. 4,046,061 and 6,786,238, the flow forces, proportional to the flow, act simultaneously in opposite directions so that the clevis is balanced and centered. The clevis, however, needs to be big due to the requirement for bigger orifices to handle larger flows.

Jet pipe servovalves provide an alternative to 'flapper'-type servovalves. Jet pipe servovalves are usually larger than flapper type servovalves but are less sensitive to contamination. In jet pipe systems, fluid is provided via a jet pipe to a nozzle which directs a stream of fluid at a receiver. When the nozzle is centered—i.e. no current from the motor causes it to turn, the receiver is hit by the stream of fluid from the nozzle at the centre so that the fluid is directed to both ends of the spool equally. If the motor causes the nozzle to turn, the stream of fluid from the nozzle impinges more on one side of the receiver and thus on one side of the spool more than the other causing the spool to shift. The spool shifts until the spring force of a feedback spring produces a torque equal to the motor torque. At this point, the nozzle is centred again, pressure is equal on both sides of the receiver and the spool is held in the centered position. A change in motor current moves the spool to a new position corresponding to the applied current.

Such systems will be described further below with reference to FIG. 1a.

As mentioned above, jet pipe servovalves are advantageous in that they are less sensitive to contamination e.g. in the supply fluid or from the valve environment. These valves are, however, more complex and bulkier. Additional joints are required for the fluid supply pipe and the supply pipe from the fluid supply to the jet pipe is mounted outside of the servovalve body in the torque motor chamber. In the event of damage to the pipe, this can result in external leakage. The pipe, being external, adds to the overall size and is more vulnerable to damage.

European Patent Application 16461572 teaches a jet-pipe type servovalve wherein fluid is provided to the nozzle via a connector header in fluid communication with the interior of the spool, the spool being provided with one or more openings via which fluid from the supply port enters the interior of the spool and flows into the connector header and to the nozzle.

The servovalve includes drive means for steering the nozzle in response to the control signal. The drive means may include a motor such as a torque motor arranged to steer the nozzle by means of an induced current. Other drive means may be used to vary the position of the nozzle. The drive means may be mounted in a housing attached to the valve assembly.

The arrangement of EP 16461572 enables the conventional outside supply pipe to be removed and allows the jet pipe to be fed with fluid via the spool and a feedback spring.

There is a need for a servovalve arrangement that can handle large fluid flows effectively and at high operation frequency, whilst retaining a compact design and being less vulnerable to contamination, damage and leakage.

The present disclosure provides a servovalve comprising: a fluid transfer valve assembly comprising a supply port and a control port; a moveable valve spool arranged to regulate flow of fluid from the supply port to the control port in response to a control signal; and a drive stage assembly configured to axially move the valve spool relative to the fluid transfer assembly in response to the control signal to regulate the fluid flow; wherein the drive stage assembly comprises a piezoelectric actuator configured to vary the flow of fluid to respective ends of the valve spool in response to the control signal.

The piezoelectric actuator may comprise a piezoelectric element and a rod, the rod arranged to move axially in response to expansion and/or contraction of the piezoelectric element depending on voltage applied to the element.

The drive assembly may further comprise a housing within which the piezoelectric actuator is mounted, the housing comprising first and second orifices at respective ends of the housing, the housing being connected to the fluid transfer valve assembly via a first fluid channel from the first orifice and a second fluid channel from the second orifice, the first fluid channel providing a path for the flow of fluid to a first of the respective ends of the valve spool and the second fluid channel providing a path for the flow of fluid to a second of the respective ends of the valve spool.

The fluid transfer valve assembly may further comprise a torsion spring at each of the respective ends of the valve spool.

The valve spool may be moveably mounted in a cylindrical housing, having an end cap at each end.

Also provided is a method of driving a valve spool of a servovalve comprising applying a voltage to a piezoelectric actuator to cause the piezoelectric actuator to move, responsive to the applied voltage, to regulate flow of a fluid to respective end of the valve spool.

Preferred embodiments will now be described with reference to the drawings.

DETAILED DESCRIPTION

A servovalve as described below can, for example, be used in an actuator control system. The servovalve is controlled by a drive assembly to control a control flow of fluid that is output via e.g. a butterfly value to control the movement of an actuator.

Conventional jet pipe and flapper servovalves will first be described with reference to FIGS. 1a-1c.

Figure 1B:
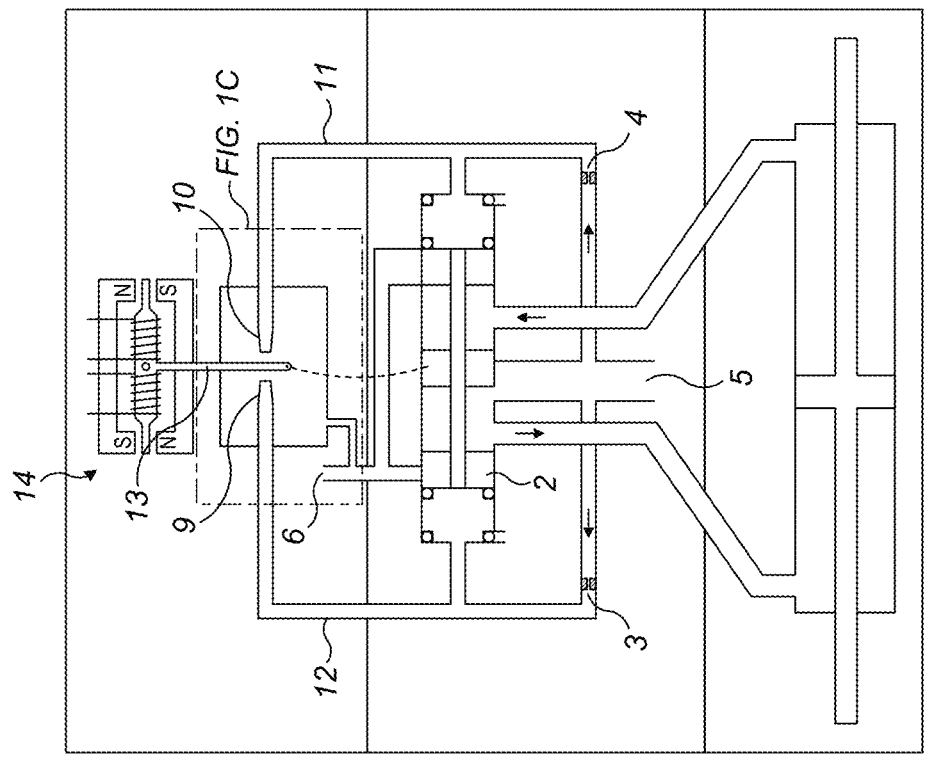
FIG. 1b is a schematic view of a conventional flapper type servovalve.
Figure 1A:
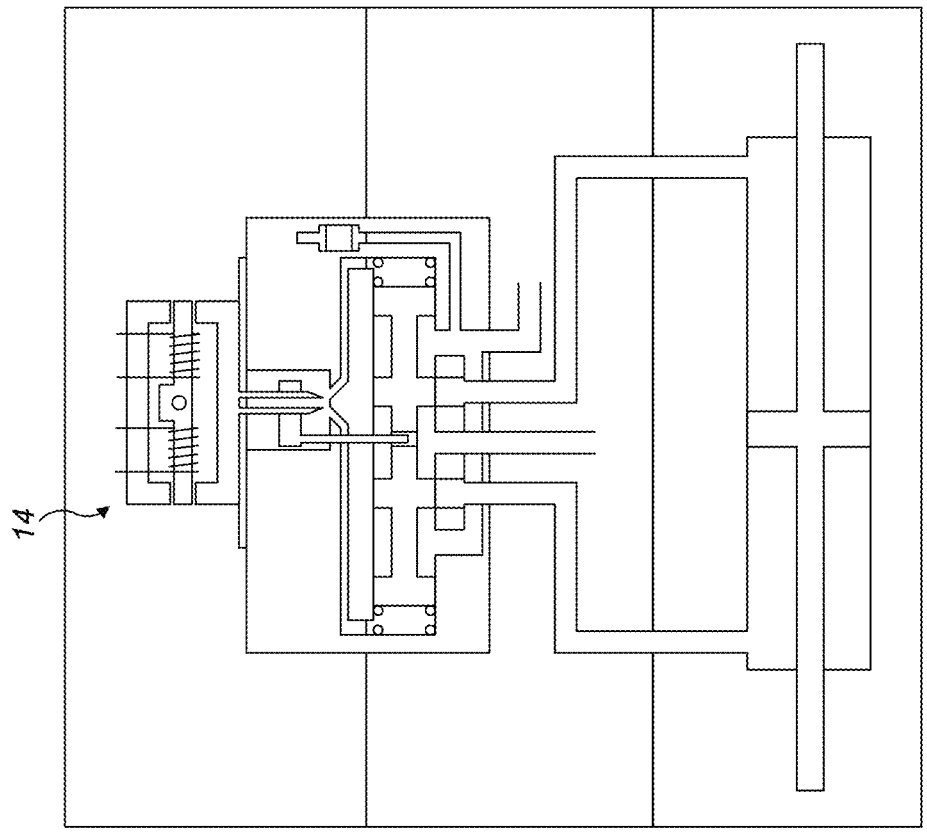
FIG. 1a is a schematic view of a conventional jet-pipe type servovalve.
Figure 1C:
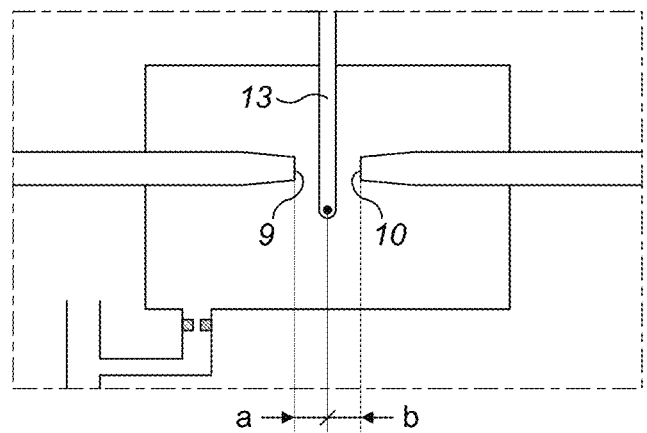
FIG. 1c is a detailed view of the flapper servovalve of FIG. 1b.

A typical flapper servovalve is shown in FIGS. 1b and 1c. The assembly comprises a first stage comprising the drive assembly, and a second stage comprising a spool assembly. FIG. 1b also shows, at the bottom, the actuator controlled by the servovalve. Operation of the valve comprises causing the spool 2 to move to the left and/or right so as to align ports in the spool 2 with fluid channels to control the flow of fluid through the valve and out of a control port to control the actuator or other moveable part. The movement of the spool 2 is caused by the pressure of the hydraulic fluid (here oil supplied to the assembly from oil reservoir or supply 5 via orifices 3,4, but can be any hydraulic fluid) acting on one or other of the ends of the spool 2 via channels 11,12. The pressure at the respective ends is varied in accordance with a control signal applied to the drive assembly selected according to the desired output from the valve. The hydraulic fluid is returned to the supply via a return path 6.

Therefore, when the control signal is such as to cause the drive assembly to apply greater fluid pressure to one end of the spool, by diverting more fluid to that end via channel 12, as compared to channel 11, the spool 2 will move to the right. If greater fluid pressure is applied via channel 11, the spool 2 will move to the left. In the flapper arrangement, shown, the control signal is applied to a torque motor and armature 14 which causes a flapper-type drive member 13 to deflect left or right. The flapper 13 is positioned between orifices 9,10 at the ends of channels 12,11 respectively, as best seen in FIG. 1c. If the control signal, via armature 14, causes the flapper 13 to move to the right thus closing off orifice 10 of channel 11, then the hydraulic fluid will flow through channel 12, via (open) orifice 9, thus increasing the pressure at the left end of the spool 2 and causing the spool to move to the right. If the control signal is such as to cause the flapper 13 to move to the left, closing orifice 9 of channel 12, then more pressure is provided to the other end of the spool 2 via channel 11, causing the spool 2 to move to the left.

The principles of operation are similar for the jet-pipe type assembly, but instead of the drive member being a flapper 13 that moves to close off a respective channel, the drive member is a pipe with a nozzle which is deflected left or right responsive to the control signal and from which fluid is ejected to either the left or the right end of the spool.

In a conventional jet-pipe type assembly, as shown in FIG. 1a, the arrangement comprises a servovalve assembly have a torque motor and a moveable spool mounted in a supporting block, or mounted in a cylinder mounted in a block. The spool is, as for the flapper type arrangement, part of a spool assembly having: supply ports, control ports PA, and a return port PB. Flow is possible between the ports via a passage through the spool. The torque motor provides current that causes a jet pipe to turn at its end closest to the spool, which end terminates in a nozzle. Supply fluid is provided from the supply port, via a supply pipe to the top of the jet pipe—i.e. the end opposite the end with the nozzle, and the supply fluid flows through the jet pipe and out of the nozzle. A receiver is provided in the block below the nozzle. The receiver provides two channels via which fluid from the nozzle flows into the spool. When no current is applied by the motor to the jet pipe, the nozzle is centered relative to the receiver and supply fluid exiting the nozzle flows equally through both channels and thus equally to both ends of the spool. The spool therefore remains centered—i.e. 'closed' so that no fluid flows through the control ports. When actuator control is desired, the motor provides a control current to the jet pipe causing the nozzle to turn away from the centered position. The supply fluid through the nozzle then flows predominantly through one receiver channel as compared to the other channel. More fluid flows, therefore, into the corresponding end of the spool causing axial movement of the spool with either blocks/occludes the passage between the supply port and the respective control port or opens the passage to allow flow between the two ports, depending on the axial position of the spool due to the position of the nozzle, thus modulating pressure on the control ports and controlling the actuator. A supply pipe is also connected to the supply port and routes supply fluid external to the spool and into the top end of the jet pipe. The supply fluid flows down the jet pipe to the nozzle and exits to the receiver described above. The jet pipe is preferably mounted in a flexural tube. While the nozzle is centered, equal amounts of fluid go to the two ends of the spool.

In an example, the assembly is arranged to control an actuator based on the fluid flow from the control port e.g. via a butterfly valve. The servovalve controls an actuator which, in turn, controls an air valve such as a butterfly valve.

Supply pressure is provided to the servovalve housing via supply port and to the spool via spool supply ports. The pressure at return port is a return pressure which will vary depending e.g. on the altitude of the aircraft in flight. Control ports provide a controlled pressure, dependant on the nozzle/flapper position and resulting spool position, to be provided to an actuator.

The spool 2 is in the form of a tubular member arranged in a valve block 1 to be moved axially by the hydraulic fluid.

In more detail, both in the conventional flapper or jet-pipe type assemblies, to open the servovalve, control current is provided to coils of the motor (e.g. a torque motor) creating electromagnetic torque opposing the sum of mechanical and magnetic torque already 'present' in the torque motor. The bigger the electromagnetic force from the coils, the more the jet pipe nozzle turns or the flapper pivots. The more it turns/pivots, the greater the linear or axial movement of the spool. A torque motor usually consists of coil windings, a ferromagnetic armature 14, permanent magnets and a mechanical spring (e.g. two torsional bridge shafts). This arrangement provides movement of the nozzle/flapper proportional to the input control current.

Jet-pipe arrangements can operate at high frequency but only for average pressure levels. In contrast, the flapper arrangements can operate at higher pressures, but at lower frequency.

One problem that has been identified with these conventional systems is that when the drive member (flapper or nozzle) is in an extreme left or right position there is some deformation to the directional characteristics due to oil pressure acting on the flapper or by the resilience of the bending jet pipe.

Figure 2:
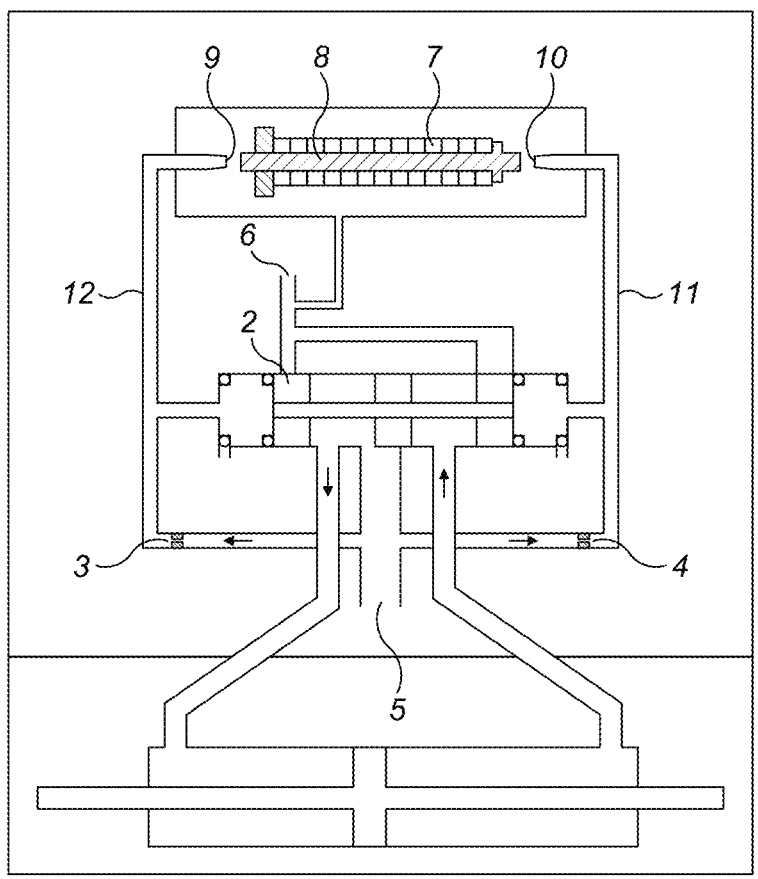
FIG. 2 is a schematic view of a servovalve according to the present disclosure
Figure 3:
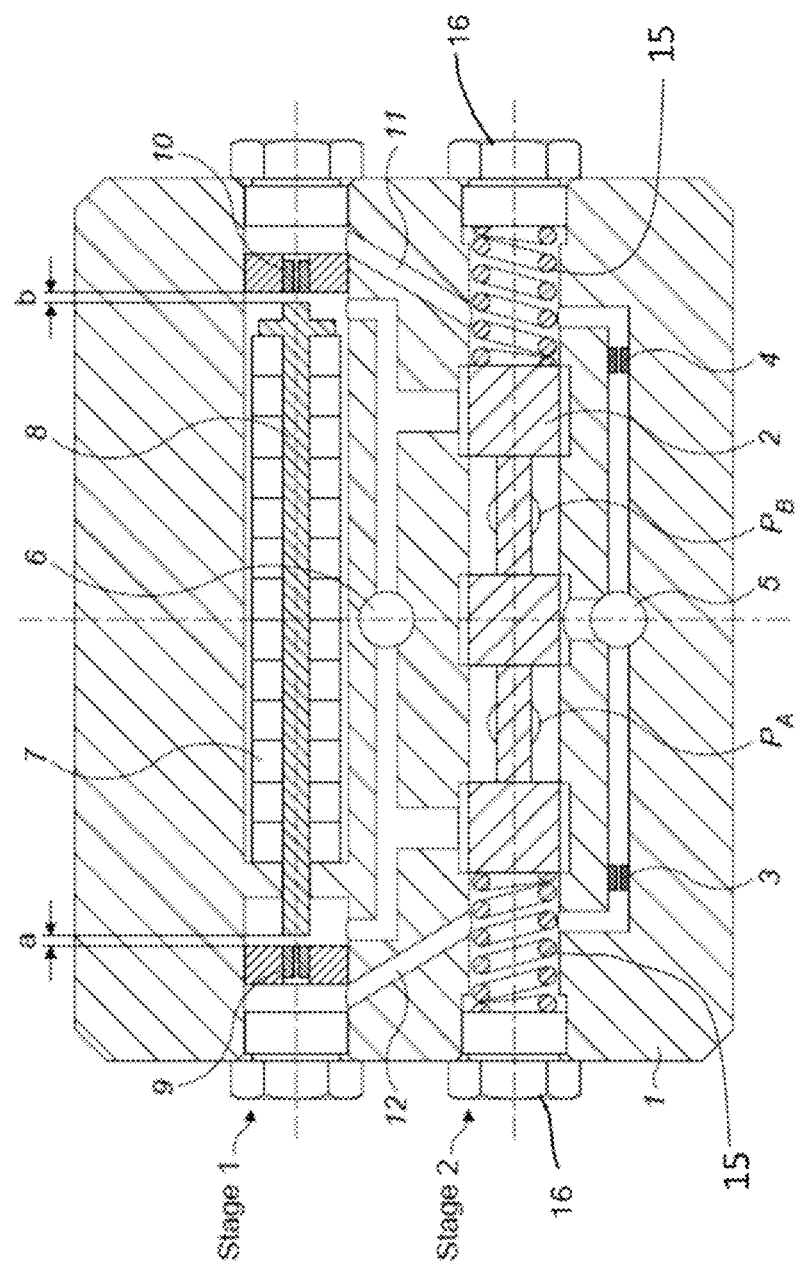
FIG. 3 shows a cross-section view of one embodiment of a servovalve assembly according to this disclosure.

As can be seen from FIGS. 2 and 3, the arrangement of the present disclosure replaces the entire first stage with a piezoelectric drive assembly comprising a piezoelectric actuator 7, 8 positioned between channels 11 and 12, the actuator 7, 8 being activated, responsive to a control signal, to open or close orifices 9, 10 to control fluid flow through the system. The actuator comprises a piezoelement 7 and a rod 8 connected thereto. When a voltage (from the control signal) is applied to the piezoelectric actuator, the piezoelement expands so as to close off orifice 10. The hydraulic fluid is then forced to flow via channel 12 to the left end of the spool 2 causing the spool to move to the right. If the voltage is decreased, the piezoelement becomes shorter and closes off orifice 9 forcing the hydraulic fluid to flow via channel 11 to the right end of the spool causing the spool 2 to move to the left. As such, the valve spool 2 is moveably mounted in a cylindrical housing 1 (also referred to herein as valve block), having an end cap 16 at each end. A compression spring 15 is located at each end of the spool 2. In more detail, in a neutral state, with some voltage applied to the piezoelectric actuator, the rod 8 is in a centred position so that distances a and b (FIG. 3*b*) are substantially equal and orifices 9 and 10 are both open. Varying the voltage applied to the actuator causes the piezoelement 7 to expand or contract which varies the distances a and by moving rod 8 left or right depending on the voltage. The rest of the operation of the spool assembly is analogous to that of the flapper and jet-pipe arrangements.

The piezoelectric drive arrangement can operate at a higher frequency than the motor drive systems (approximately three to four times faster) and is, therefore, a more responsive system. The force of the present system is also greater than that of conventional systems and the drive is more 'direct'

Further, the drive assembly—i.e. the piezoactuator 7 can be provided in the same housing as the second, spool assembly, stage. The design of the present system is considerably simplified and is smaller and lighter than conventional systems.

Although this disclosure has been described in terms of preferred examples, it should be understood that these examples are illustrative only and modifications and alterations are possible within the scope of the claims.

The invention claimed is:

1. A servovalve comprising:
a fluid transfer valve assembly comprising a supply port and a control port;
a moveable valve spool comprising a tubular body defining an axis and having a first end and a second end, arranged to regulate flow of fluid from the supply port to the control port through the valve spool body by controlling alignment of the supply port and the control port with fluid channels through the valve spool body in accordance with axial displacement of the valve spool in response to a control signal; and
a drive assembly configured to axially move the valve spool relative to the supply port and the control port in response to the control signal to regulate the fluid flow;
the drive assembly comprising a first fluid channel having a first end in fluid flow engagement with a source of pressurized fluid and a second end terminating in a first orifice the first channel arranged to provide pressurized fluid to the first end of the valve spool at a location between the first and second end of the first fluid channel, the drive assembly further comprising a second fluid channel having a first end in fluid flow engagement with the source of pressurized fluid and a second end terminating in a second orifice the second channel arranged to provide pressurized fluid to the second end of the valve spool at a location between the first and second end of the second fluid channel, such that axial displacement of the valve spool is caused by a pressure differential between the fluid applied to the first end and the fluid applied to the second end of the valve spool;
wherein the drive assembly comprises:
a piezoelectric actuator configured to vary the flow of fluid to respective ends of the valve spool in response to the control signal; and
the drive assembly further comprises a housing within which the piezoelectric actuator is mounted, the housing comprising the first and second orifices at respective ends of the housing, the housing being connected to the fluid transfer valve assembly via the first fluid channel from the first orifice and the second fluid channel from the second orifice;
wherein the piezoelectric actuator comprises a piezoelectric element and a rod, located between, and extending axially with respect to the first and second orifices, the rod arranged to move axially in response to expansion and/or contraction of the piezoelectric element depending on voltage applied to the element to accordingly release or block the first or second orifices, such that blocking the first orifice increases pressure applied to the first end of the valve spool causing the valve spool to move axially in the direction of the second end and blocking the second orifice increases pressure applied to the second end of the valve spool causing the valve spool to move axially in the direction of the first end.

2. The servovalve of claim 1, wherein the fluid transfer valve assembly further comprises a compression spring at each of the respective ends of the valve spool.

3. The servovalve of claim 1, wherein the valve spool is moveably mounted in a cylindrical housing, having an end cap at each end.

4. The servovalve of claim 2, wherein the valve spool is moveably mounted in a cylindrical housing, having an end cap at each end.

5. A method of operating the servovalve of claim 1, the method comprising:
   applying the voltage to the piezoelectric actuator to cause the piezoelectric actuator to move the valve spool so that the valve spool regulates flow of fluid from the supply port to the control port.

\* \* \* \* \*